US008941979B2

(12) United States Patent
Griffin et al.

(10) Patent No.: US 8,941,979 B2
(45) Date of Patent: Jan. 27, 2015

(54) FOLDABLE KEYBOARD

(75) Inventors: Jason Tyler Griffin, Kitchener (CA); James William Reeves, Twyford (GB)

(73) Assignee: BlackBerry Limited, Waterloo (CA)

( * ) Notice: Subject to any disclaimer, the term of this patent is extended or adjusted under 35 U.S.C. 154(b) by 286 days.

(21) Appl. No.: 13/422,140

(22) Filed: Mar. 16, 2012

(65) Prior Publication Data

US 2013/0242492 A1 Sep. 19, 2013

(51) Int. Cl.
G06F 1/16 (2006.01)

(52) U.S. Cl.
CPC .................................. *G06F 1/1662* (2013.01)
USPC ................................ 361/679.08; 361/679.01

(58) Field of Classification Search
CPC ... G06F 3/0221; G06F 1/1666; G06F 3/0219; G06F 1/16; G06F 3/0231; G06F 1/1613; G06F 1/1669; G06F 1/1671; G06F 3/021; G06F 1/1601; G06F 1/1662; G06F 1/1616; G06F 3/04886; G06F 1/1626; G06F 1/3271; H05K 5/0217; H05K 7/1494; H05K 7/00
USPC ............ 361/679.01, 679.02, 679.08, 679.09, 361/679.21, 679.26, 679.27, 361/679.55–679.58, 679.11–679.17; 341/22–33; 400/472–496; 345/168–172; 248/917–924
See application file for complete search history.

(56) References Cited

U.S. PATENT DOCUMENTS

| 4,610,415 | A | 9/1986 | Miller |
| 6,053,589 | A | 4/2000 | Lin |
| 7,196,692 | B2 | 3/2007 | Mochizuki et al. |
| 7,353,568 | B2 | 4/2008 | Duan et al. |
| 7,446,757 | B2 | 11/2008 | Mochizuki et al. |
| 7,612,989 | B2 | 11/2009 | Northway |
| 8,570,726 | B2 * | 10/2013 | Wu et al. .................. 361/679.15 |
| 2004/0008154 | A1 | 1/2004 | Miyata et al. |
| 2004/0104897 | A1 | 6/2004 | Mochizuki et al. |
| 2004/0130860 | A1 | 7/2004 | Vathulya |
| 2004/0264118 | A1 | 12/2004 | Karidis et al. |
| 2005/0212772 | A1 | 9/2005 | Mochizuki et al. |
| 2006/0138913 | A1 | 6/2006 | Kim et al. |

(Continued)

FOREIGN PATENT DOCUMENTS

| EP | 1939470 A1 | 7/2008 |
| EP | 2161906 A2 | 3/2010 |

(Continued)

OTHER PUBLICATIONS

Extended European Search Report from related European Patent Application No. 12187865.6 dated May 3, 2013; 10 pages.

(Continued)

*Primary Examiner* — Jinhee Lee
*Assistant Examiner* — Ingrid Wright
(74) *Attorney, Agent, or Firm* — Fitch, Even, Tabin & Flannery LLP

(57) ABSTRACT

A foldable keyboard including an upper housing having a plurality of keys, a lower housing having a plurality of keys, a spine member configured for pivotally connecting the upper and lower housings along a horizontal axis defined by the upper and lower housings, and a hinge mechanism provided in the spine member and configured for enabling movement of the upper housing relative to the lower housing to move the keyboard between a closed configuration and an open configuration.

10 Claims, 14 Drawing Sheets

(56) References Cited

U.S. PATENT DOCUMENTS

| | | | |
|---|---|---|---|
| 2007/0243896 A1 | 10/2007 | Maatta et al. | |
| 2007/0290890 A1* | 12/2007 | Chen et al. | 341/22 |
| 2008/0276423 A1 | 11/2008 | Wu | |
| 2010/0304799 A1 | 12/2010 | Leung et al. | |
| 2012/0046081 A1* | 2/2012 | Riddiford et al. | 455/566 |
| 2012/0127258 A1 | 5/2012 | Henty | |
| 2013/0214661 A1* | 8/2013 | McBroom | 312/325 |

FOREIGN PATENT DOCUMENTS

| | | | |
|---|---|---|---|
| EP | 2226991 | A2 | 9/2010 |
| EP | 2421229 | A2 | 2/2012 |
| GB | 2128783 | A | 5/1984 |
| JP | 2005-275964 | A | 10/2005 |
| WO | 02/017051 | A1 | 2/2002 |
| WO | 2006/115144 | A1 | 11/2006 |
| WO | 2006/120300 | A1 | 11/2006 |
| WO | 2010/028394 | A1 | 3/2010 |

OTHER PUBLICATIONS

Popa, Cristian S.; Authorized Officer; PCT Search Report and Written Opinion from related PCT/CA2013/050188 dated Jun. 19, 2013; 12 pages.

Masser, Paul et al.; U.S. Appl. No. 12/860,609, filed Aug. 20, 2010; 48 pages.

Riddiford, Martin et al.; U.S. Appl. No. 13/219,087, filed Aug. 26, 2011; 33 pages.

Extended European Search Report from related European Patent Application No. 10191012.3; dated Mar. 28, 2012; 17 pages.

Non-Final Office Action from related U.S. Appl. No. 12/860,609 dated Sep. 17, 2012; 18 pages.

Non-Final Office Action from related U.S. Appl. No. 13/219,087 dated Sep. 25, 2012; 18 pages.

Article 94(3) EPC from related European Patent Application No. 10191012.3; dated Sep. 27, 2012; 5 pages.

Extended European Search Report from related European Patent Application No. 12181779.5; Sep. 28, 2012; 7 pages.

Extended European Search Report from related European Patent Application No. 12165600.3 dated Dec. 20, 2012; 8 pages.

Final Rejection from related U.S. Appl. No. 13/219,087 dated Mar. 15, 2013; 17 pages.

Final Rejection from related U.S. Appl. No. 12/860,609 dated Jun. 10, 2013; 12 pages.

Partial European Search Report from related European Patent Application No. 12187865.6 dated Mar. 7, 2013; 5 pages.

Article 94(3) EPC from related European Patent Application No. 12187865.6 dated Apr. 29, 2014; 5 pages.

* cited by examiner

FOLDABLE KEYBOARD

BACKGROUND OF THE DISCLOSURE

This disclosure is directed to a keyboard and more specifically to a foldable and portable keyboard. Conventional portable keyboards exist for use with electronic devices such as tablet computers or handheld devices, and typically are smaller in size than full-sized keyboards used in conjunction with desktop or laptop computers.

While conventional portable keyboards may provide a smaller sized device than full-sized keyboards, such smaller sized portable keyboards may prove difficult to accurately type on for users that are more familiar with full-sized keyboards. Further, such portable keyboards can become damaged during travel, which can affect the functionality of the keys. Although foldable keyboards have been developed, due to the typically staggered arrangement of keyboard keys, hinge mechanisms in such foldable keyboards are generally complicated, which can increase costs and chance of malfunction after repeated use. In addition, during use, conventional portable keyboards are generally placed on flat surfaces such that they are planar with the surface, which may decrease user comfort during typing.

DETAILED DESCRIPTION

Figure 1:
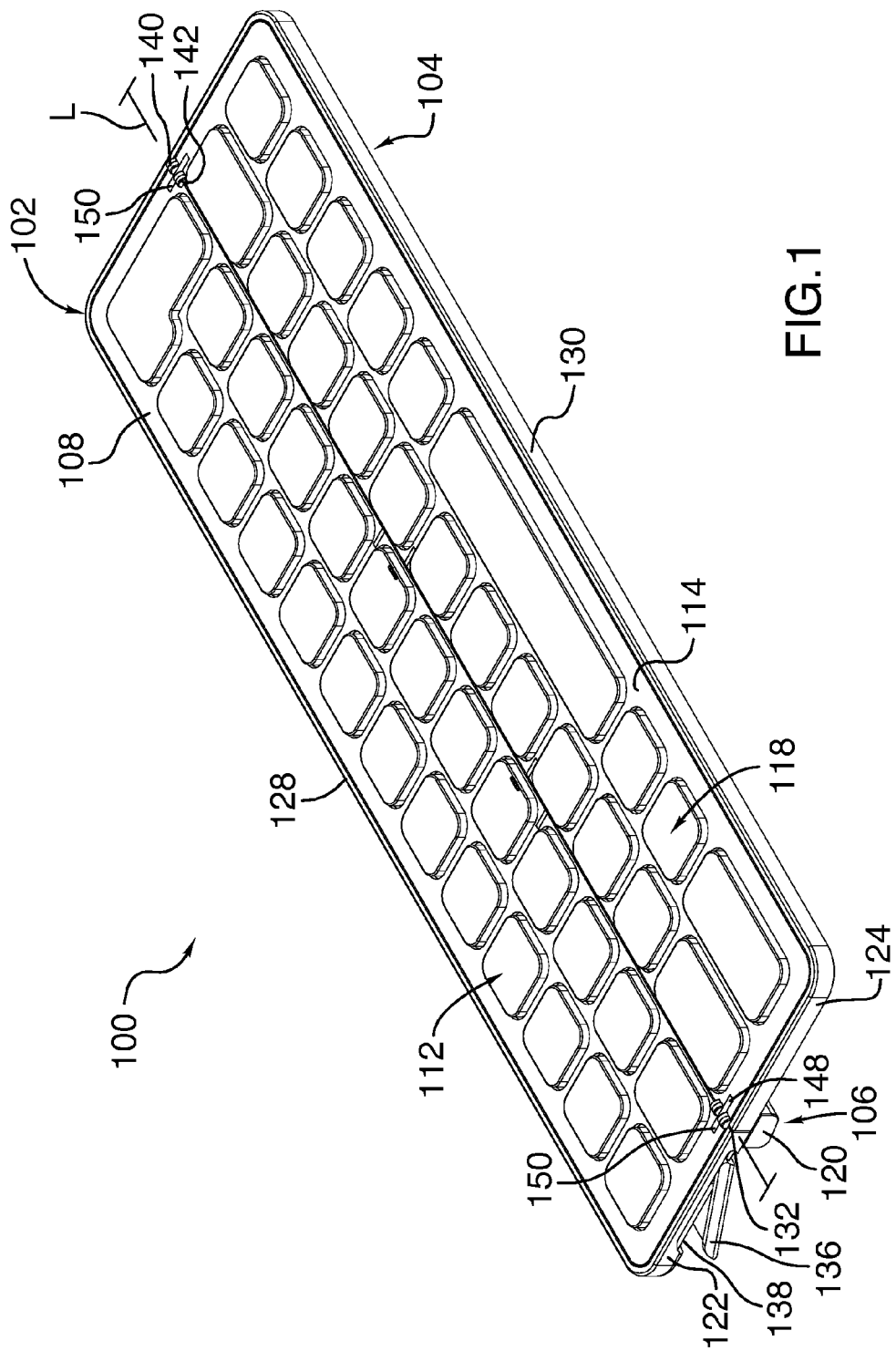
FIG. 1 is a front perspective view of a foldable keyboard in an open configuration in accordance with the present disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Figure 2:
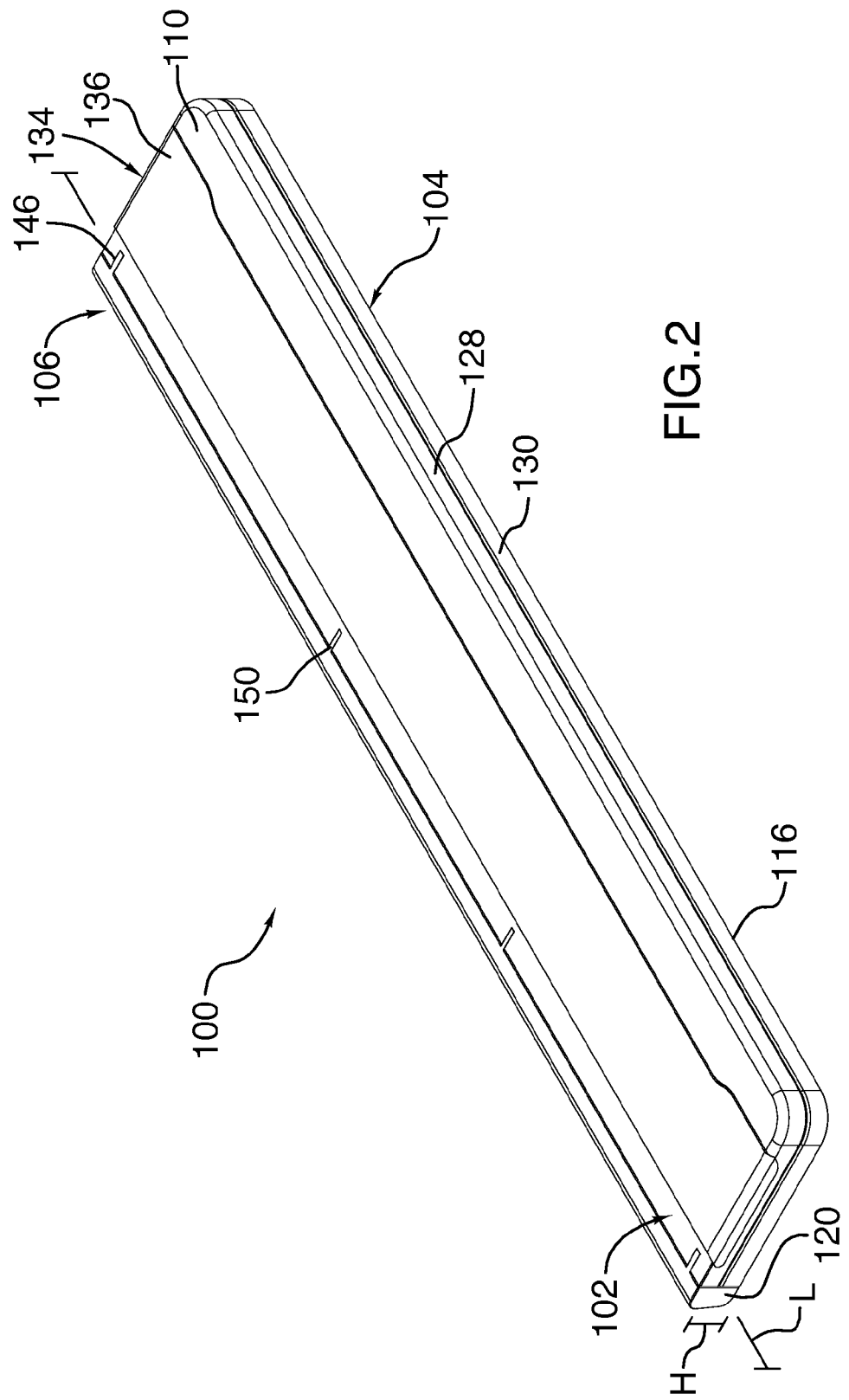
FIG. 2 is a front perspective view of the foldable keyboard in a closed configuration.

Referring to FIGS. 1 and 2, a foldable keyboard 100 is provided and includes an upper housing 102, a lower housing 104 and a spine member or spine 106 configured for attachment to the upper and lower housings and for enabling movement of the upper housing relative to the lower housing. The upper housing 102 includes an inner face 108 and an outer face 110 opposite the inner face, with the inner face 108 including a plurality of keys 112. Similarly, the lower housing 104 includes an inner face 114 and an outer face 116 opposite the inner face, where the inner face includes a plurality of keys 118. Although FIG. 1 shows the keys 112 and 118 as physical keys, it is appreciated that the keys can also be virtual keys that appear on respective touch screens (not shown). In the case of physical keys 112, 118, the keys of one or both of the upper or lower housings 102, 104 can be recessed relative to the inner face 108 or 110 thereof, such that when the keyboard 100 is in a closed configuration, the keys 112, 118 are not in physical contact with each other. Such a recessed configuration may reduce damage to the keys 112, 118 when the keyboard 100 is in the closed configuration. However, such a configuration is not required.

When the keyboard 100 is in the open configuration (FIG. 1), the upper housing inner face 108 and the lower housing inner face 114 are substantially parallel to each other and define a substantially 180° angle relative to each other. In other words, the upper housing inner face 108 and the lower housing inner face 114 are substantially planar and flush with each other when the keyboard 100 is in the open configuration. As shown in FIG. 2, when the keyboard 100 is in the closed configuration, the upper housing inner face 108 and the lower housing inner face 114 remain substantially parallel to each other but are now facing towards each other.

The spine 106 is configured for pivotally connecting the upper and lower housings 102, 104 along a horizontal axis "L" defined by the upper and lower housings. In other words, the spine 106 extends along the entire length or horizontal axis "L" of the upper and lower housings, 102, 104, such that respective opposing ends 120 of the spine are substantially flush with corresponding sidewalls 122, 124 of the upper and lower housings, respectively (see FIG. 2). The spine 106 is further configured to have a height "H", such that a top surface of the spine is flush with the upper housing outer face 110 and an opposing bottom surface of the spine is substantially flush with the lower housing outer face 116.

A hinge mechanism or assembly 126, which will be described in further detail below, is provided in the keyboard 100 and includes components that are configured for enabling the movement of the upper housing 102 about the horizontal axis L relative to the lower housing 104 to move the keyboard between the closed configuration (FIG. 2) and an open configuration (FIG. 1). Although other configurations may be suitable, in the present disclosure, a pair of identical hinge assemblies 126 are provided, each located near opposing sidewalls 122, 124 of the upper and lower housings 102, 104, respectively. Accordingly, only one of the hinge assemblies 126 will be described in detail herein.

In the present disclosure, the upper housing 102 and the lower housing 104 are approximately the same size, such that when the keyboard 100 is in the closed configuration, the sidewalls 122, 124 and outer edges 128, 130 of the upper and lower housings, respectively, are substantially flush with each other (FIG. 2). Further, although other configurations may be suitable, in the present disclosure the upper housing 102 may include two rows of keys 112, and the lower housing 104 may include two rows of keys 118—in other words, approximately ½ of the keys are provided on the upper housing, and the remaining ½ of the keys are provided on the lower housing. The keys 112, 118 can be arranged in vertically staggered columns, similar to the arrangement of a conventional PC or laptop keyboard, although such a configuration is not required. However, it is contemplated that such a vertically staggered column arrangement of the keys 112, 118 lends to easier and more comfortable user typing.

Also, as briefly mentioned above, by dividing the upper and lower housings 102, 104 of the keyboard 100 along the horizontal axis L of the keyboard, the keyboard can be easily folded along a break or gap 132 defined between a lowermost row of the keys 112 and an uppermost row of the keys 118. In other words, the gap 132 defined between the upper housing 102 and the lower housing 104 is located such that the keyboard 100 is divided approximately in half along the horizontal axis "L". This is in contrast to some conventional foldable keyboards, which are typically folded along a vertical axis of the keyboard, thereby preventing the keyboard from having vertically staggered rows as disclosed in the present application. If such conventional vertically foldable keyboards were to include vertically staggered columns of keys, it could be difficult to provide a straight or clean gap/break upon which the keyboard could be folded (i.e., a straight vertical axis upon which the keyboard could be folded). In addition, such a vertically folded keyboard could require a rather complex hinge mechanism to enable folding along the vertical axis, in contrast to the present hinge assembly, described in further detail herein.

Figure 3:
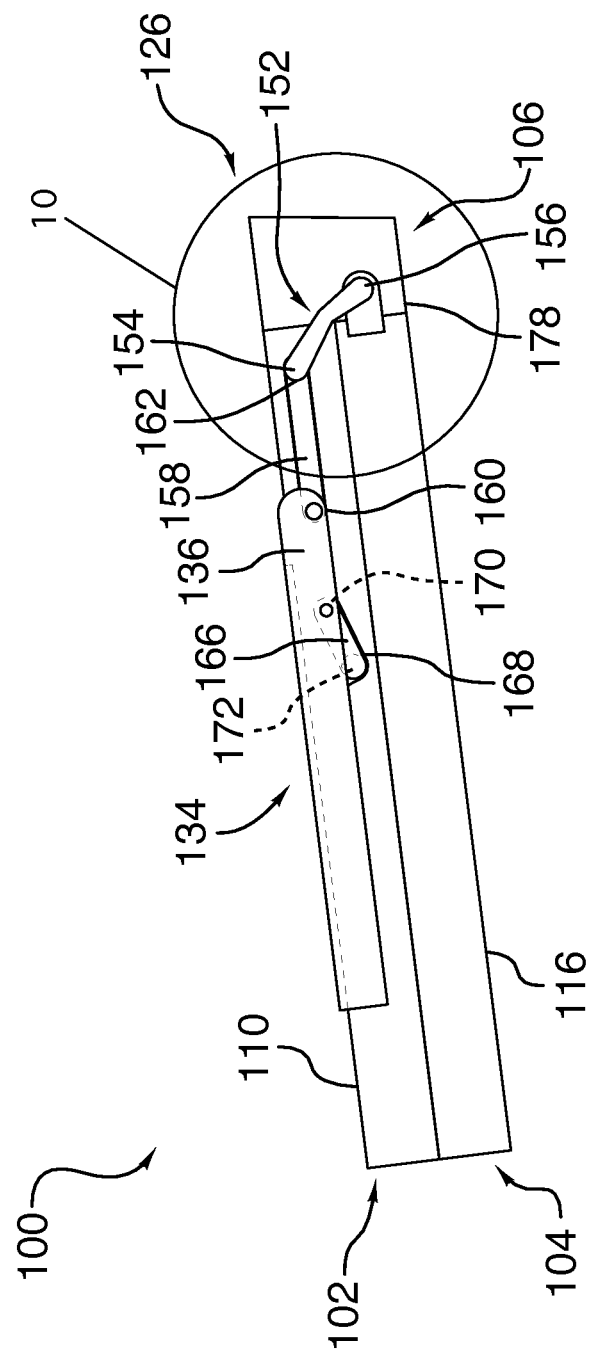
FIG. 3 is a side view of a stand mechanism of the foldable keyboard in the closed configuration.
Figure 4:
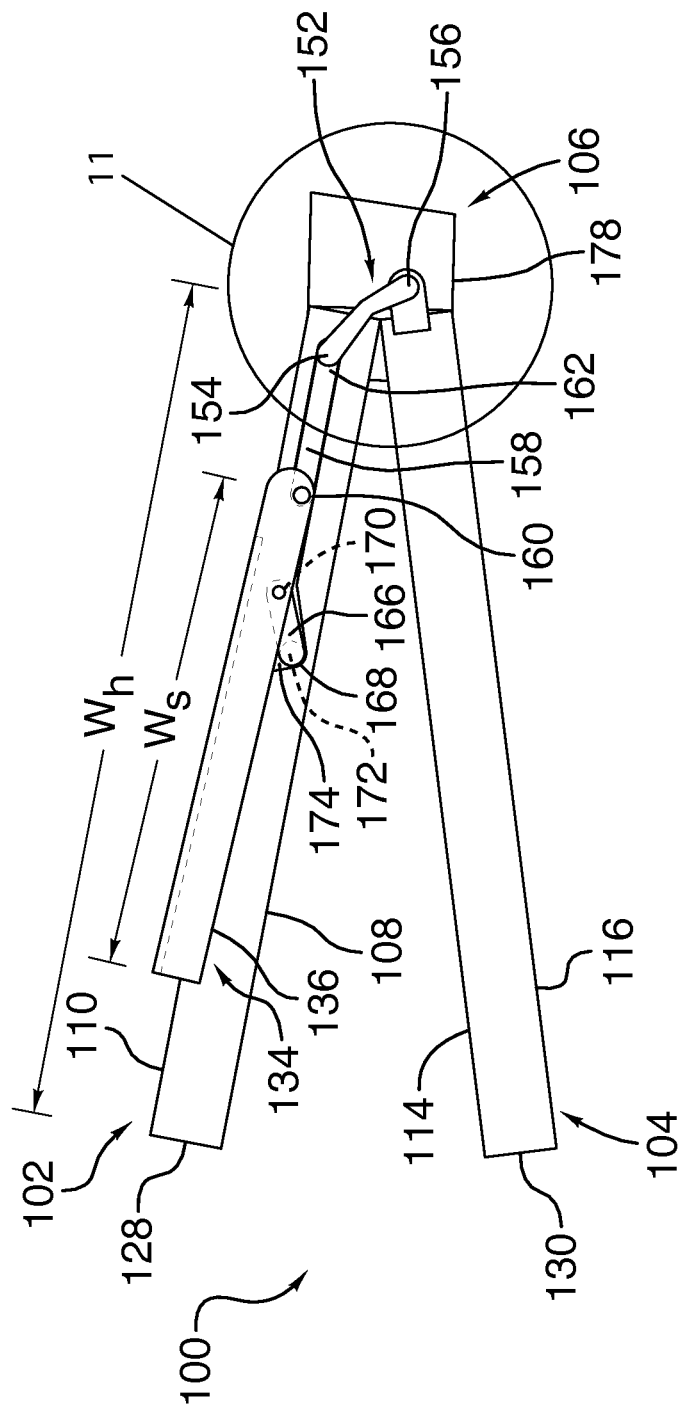
FIG. 4 is a side view of the stand mechanism of the foldable keyboard in a first intermediate position.
Figure 5:
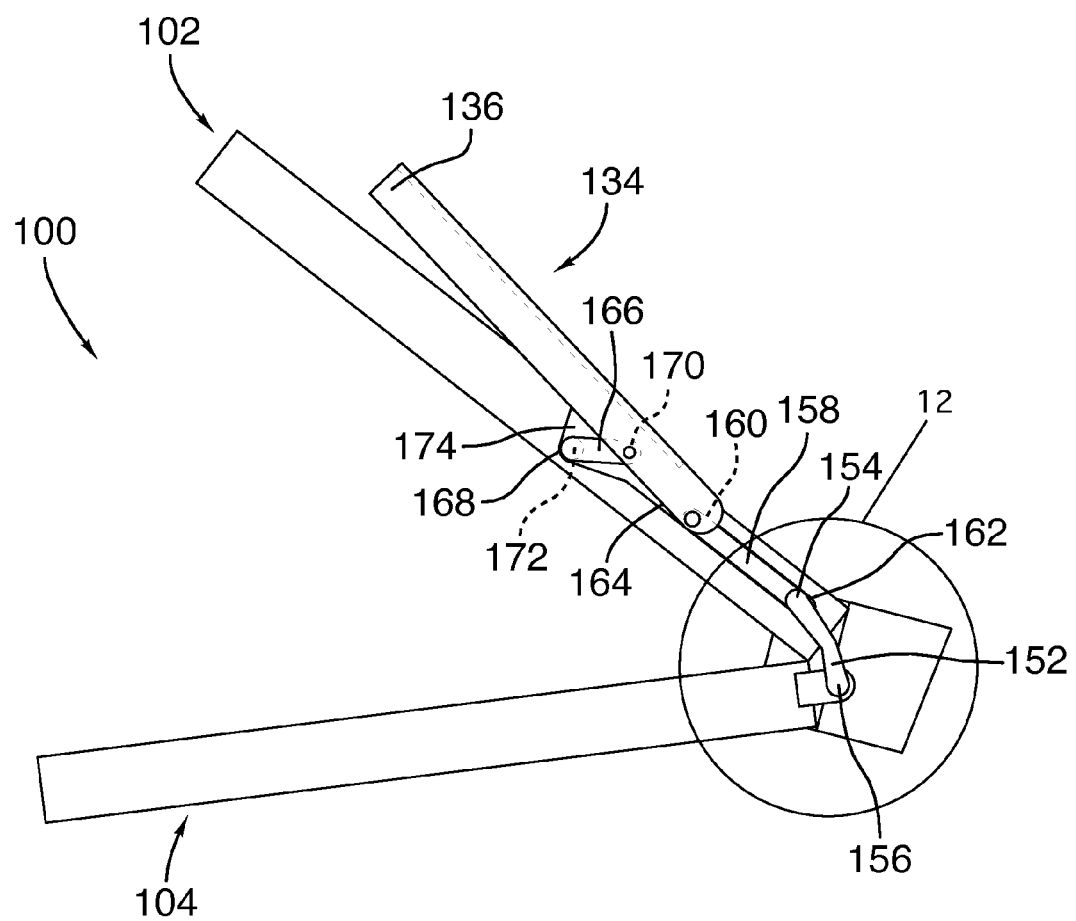
FIG. 5 is a side view of the stand mechanism of the foldable keyboard in a second intermediate position.
Figure 6:
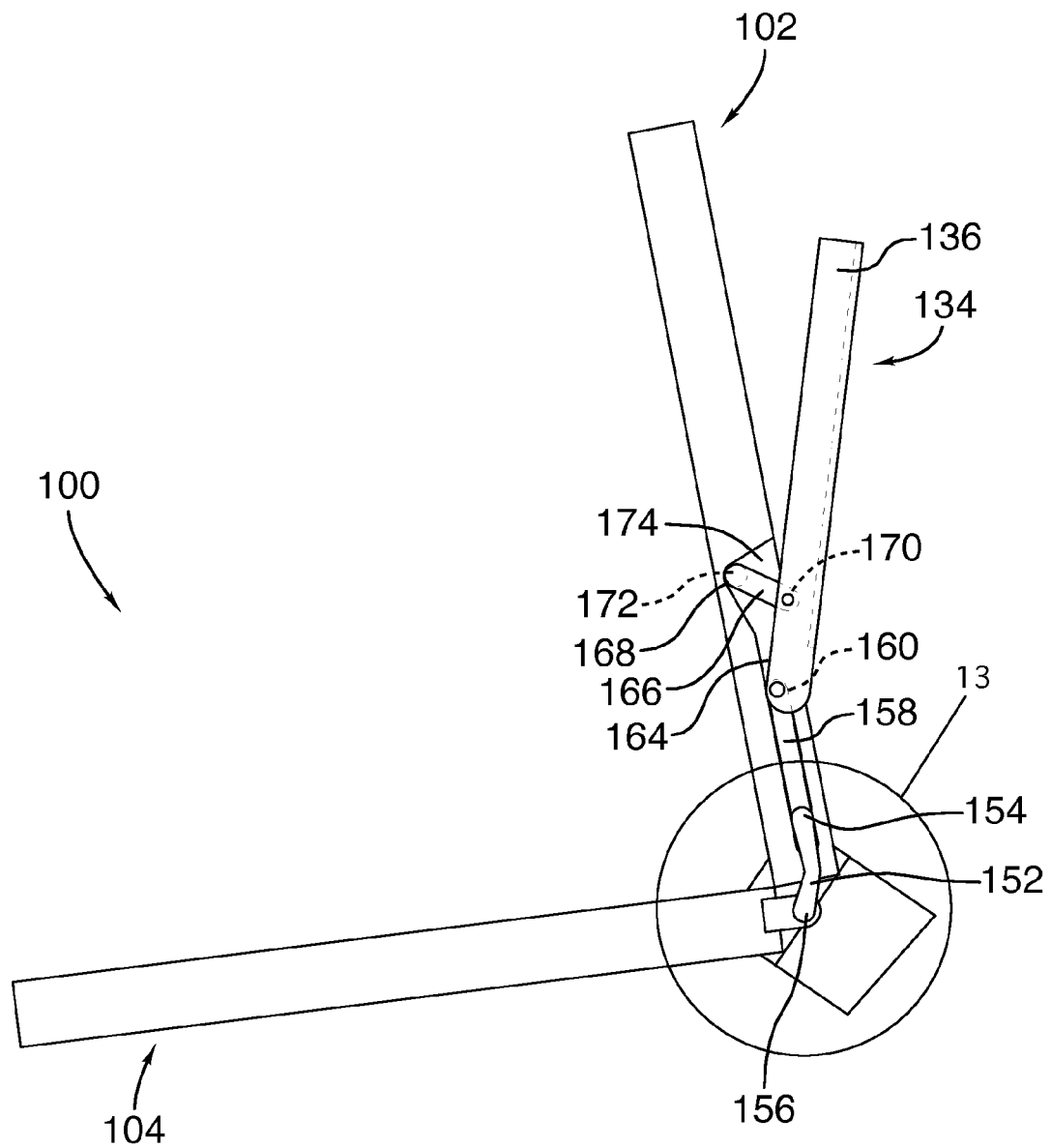
FIG. 6 is a side view of the stand mechanism of the foldable keyboard in a third intermediate position.
Figure 7:
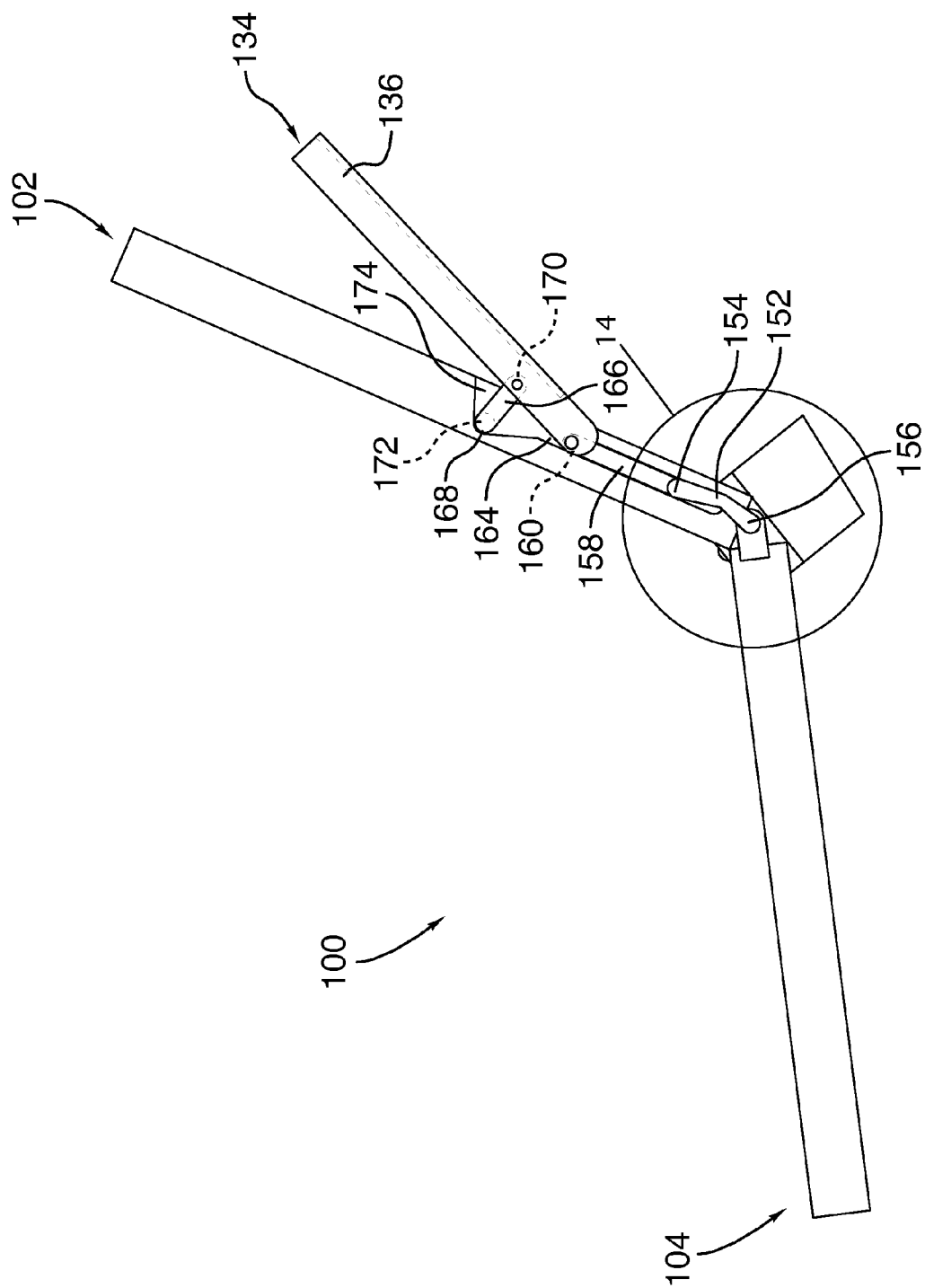
FIG. 7 is a side view of the stand mechanism of the foldable keyboard in a fourth intermediate position.
Figure 8:
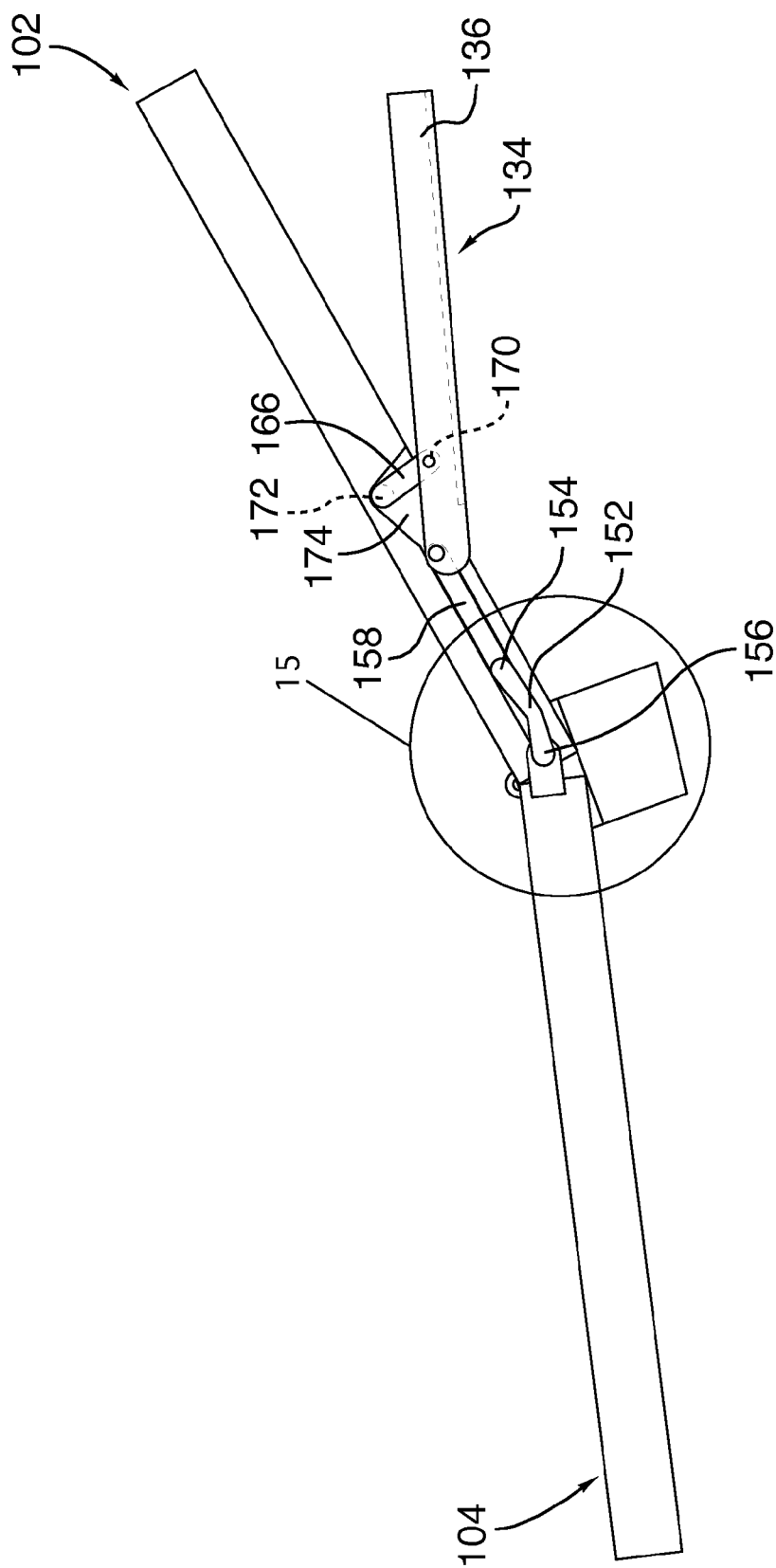
FIG. 8 is a side view of the stand mechanism of the foldable keyboard in a fifth intermediate position.

The foldable keyboard 100 further includes a stand mechanism 134, which will be described in further detail below. Broadly speaking, the stand mechanism 134 includes a stand 136 configured for translating relative to the upper housing 102 from a first position (FIG. 2) to a second position (FIG. 1) as the keyboard moves from the closed configuration to the open configuration. A recess 138 is defined in the upper housing outer face 110 and is configured for receiving the stand 136 when the stand mechanism is in the first position. The stand 136 and corresponding stand recess 138 have substantially the same length as the upper housing 102, and extend parallel to the horizontal axis "L" of the upper housing. In other words, opposing outer sidewalls of the stand 136 are substantially flush with corresponding sidewalls 122 of the upper housing 102. In the present disclosure, a width $W_s$ of the stand 136 and corresponding recess 138 are less than a width $W_h$ of the upper housing 102, as seen in FIGS. 3 and 4, for example. Since the stand 136 does not extend the entire width $W_h$ of the upper housing 102, there is ample room for the user to grip the upper housing during movement of the stand from the first position to the second position and vice versa.

Figure 10:
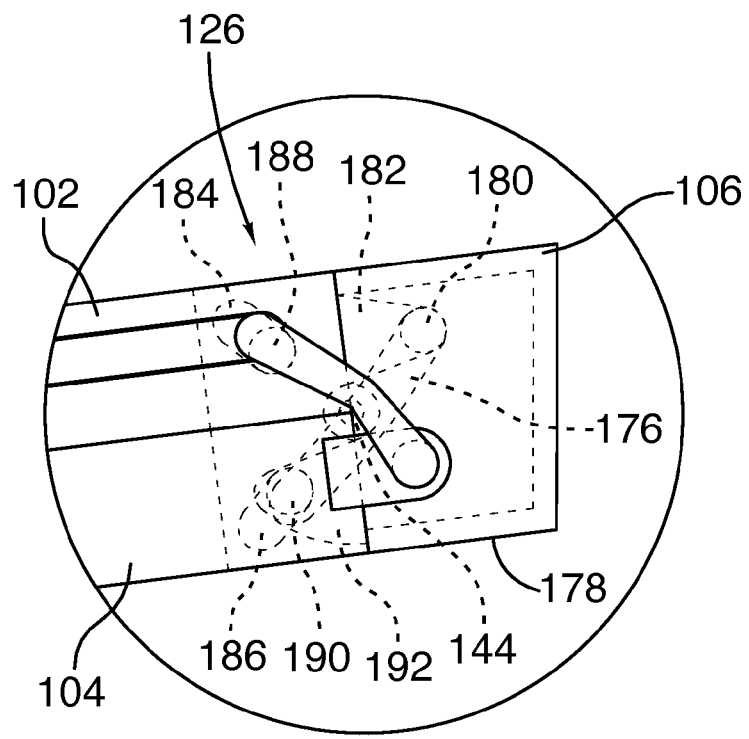
FIG. 10 is a side partial view of portion "10" in FIG. 3 showing a hinge mechanism of the foldable keyboard in the closed configuration.
Figure 11:
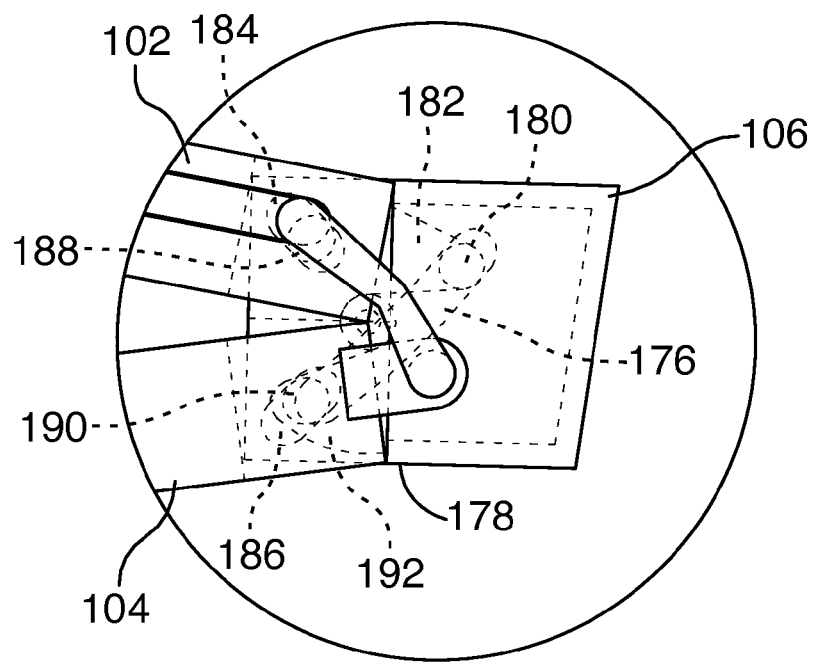
FIG. 11 is a side partial view of portion "11" in FIG. 4 showing the hinge mechanism of the foldable keyboard in the first intermediate position.
Figure 12:
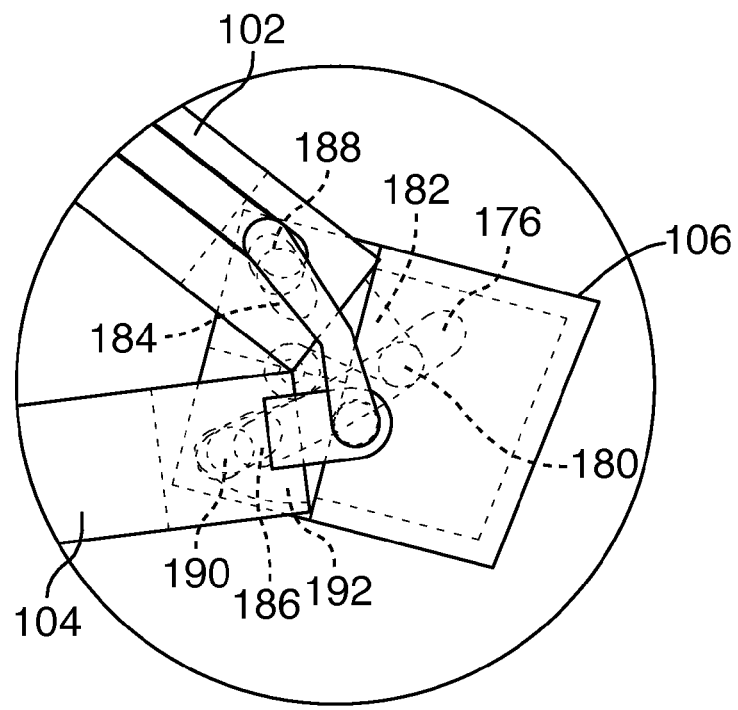
FIG. 12 is a side partial view of portion "12" in FIG. 5 showing the hinge mechanism of the foldable keyboard in the second intermediate position.
Figure 13:
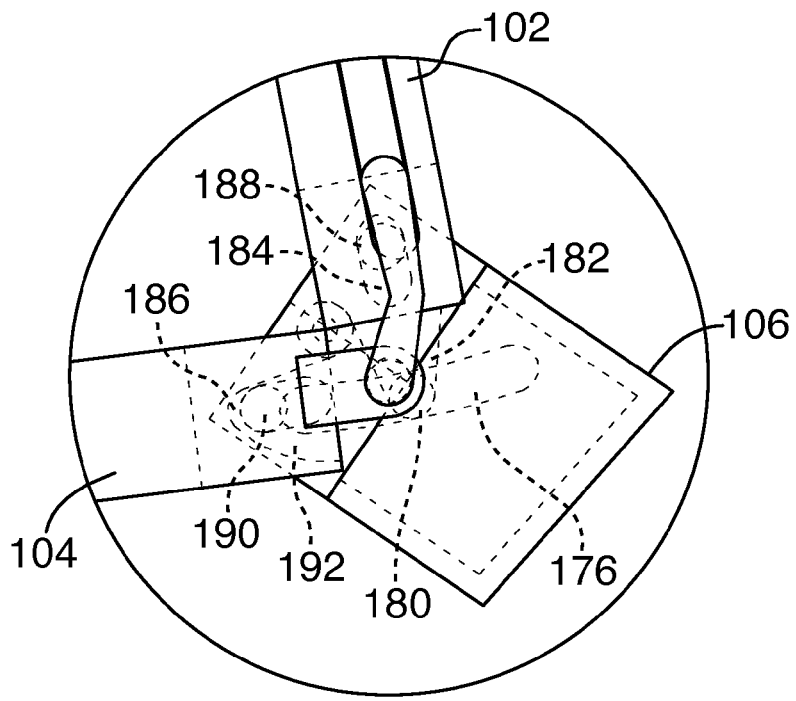
FIG. 13 is a side partial view of portion "13" in FIG. 6 showing the hinge mechanism of the foldable keyboard in the third intermediate position.
Figure 14:
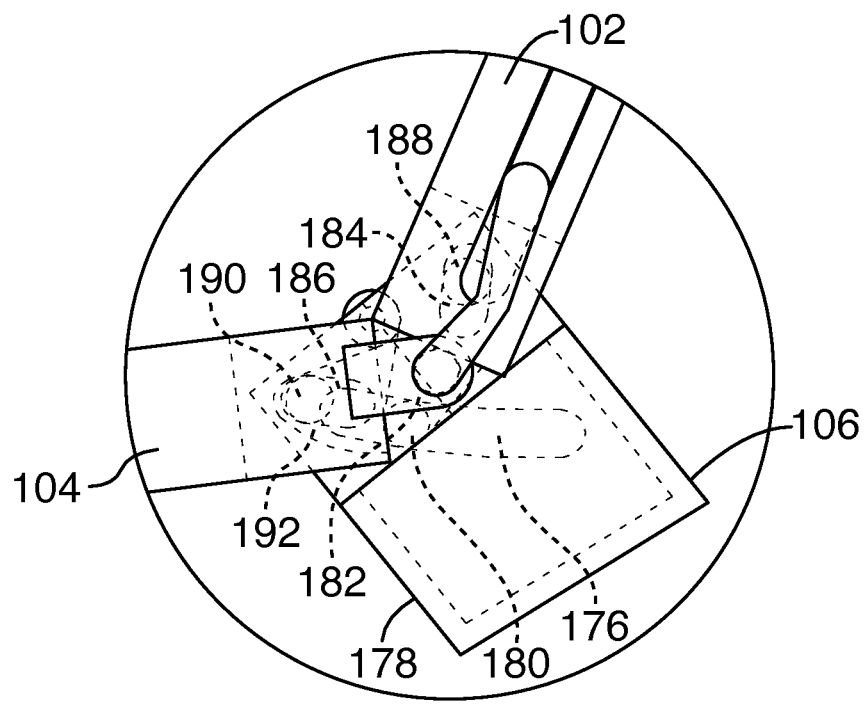
FIG. 14 is a side partial view of portion "14" in FIG. 7 showing the hinge mechanism of the foldable keyboard in the fourth intermediate position.
Figure 15:
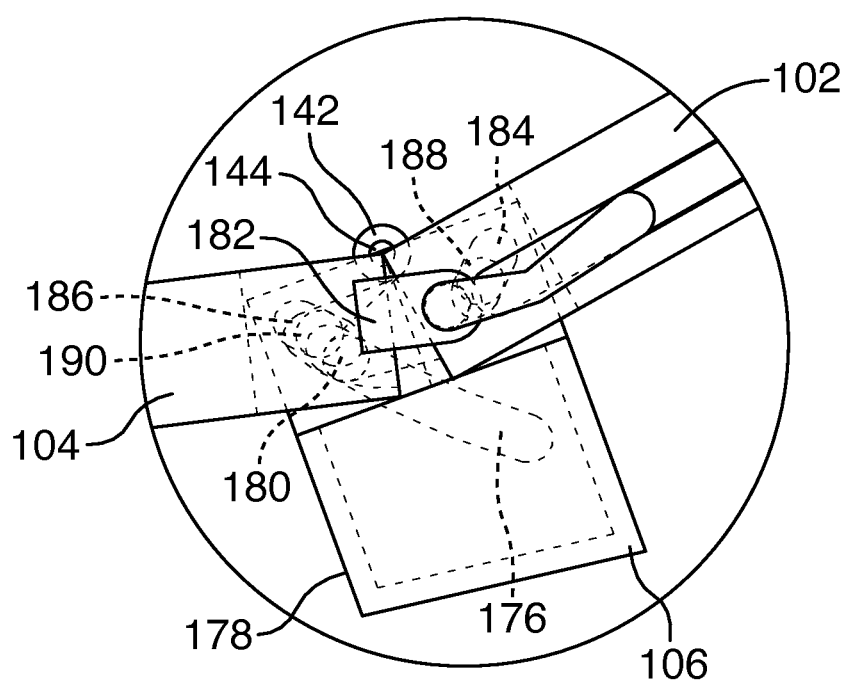
FIG. 15 is a side partial view of portion "15" in FIG. 8 showing the hinge mechanism of the foldable keyboard in the fifth intermediate position.
Figure 16:
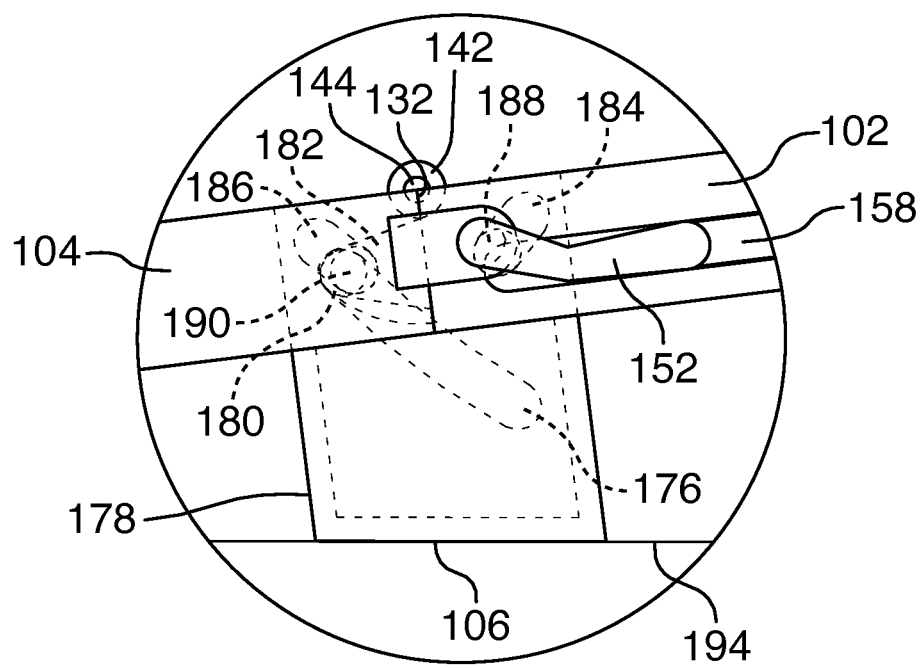
FIG. 16 is a side partial view of portion "16" in FIG. 9 showing the hinge mechanism of the foldable keyboard in the open configuration.
Figure 17:
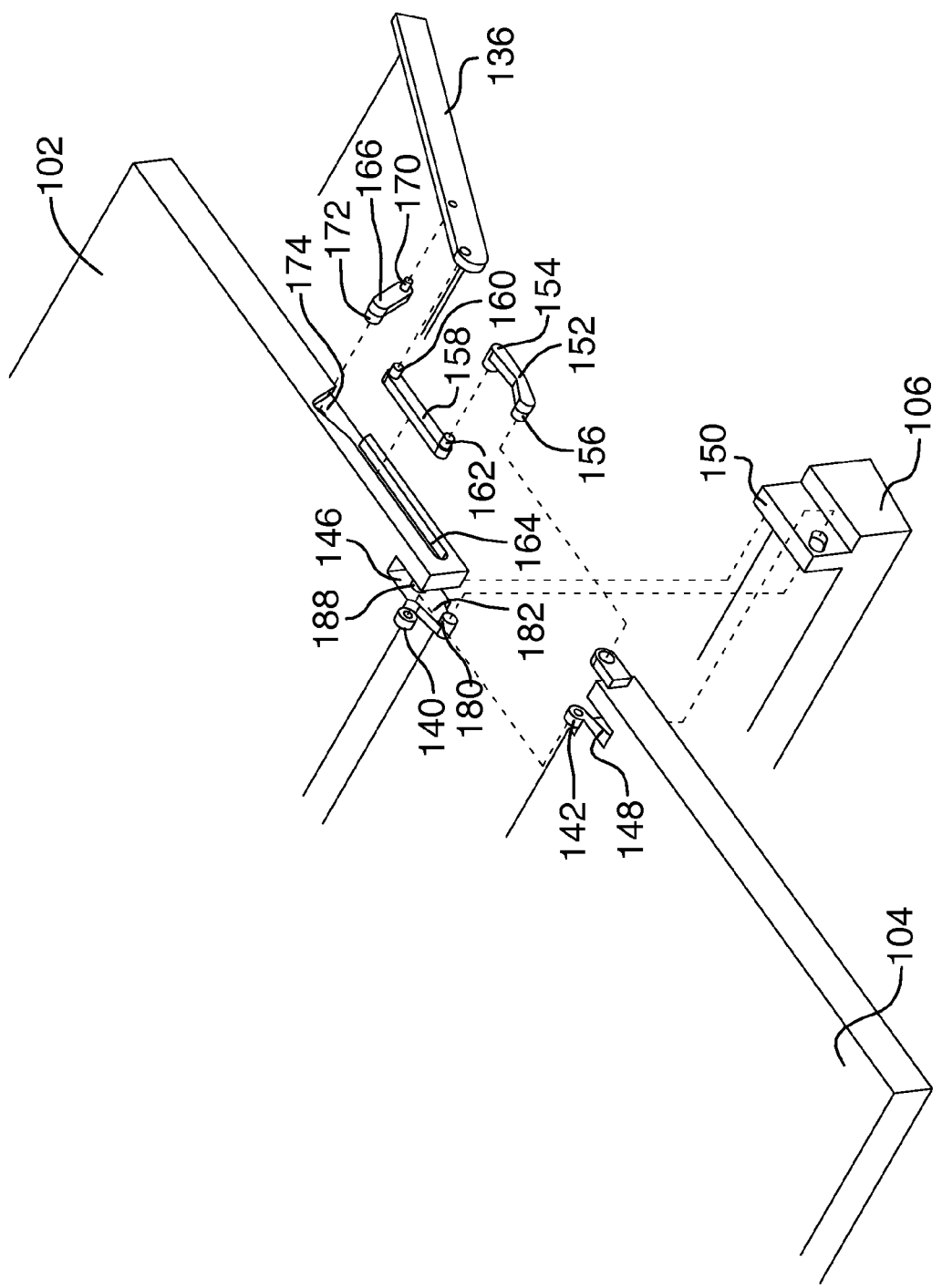
FIG. 17 is an exploded side view of the hinge and stand mechanisms of the foldable keyboard.

To enable movement of the keyboard 100 between the open and closed configurations, the hinge assembly 126 includes, among other things, an upper housing folding pivot 140 and a lower housing folding pivot 142 that are joined together by a folding pivot pin 144 (see FIG. 10, for example). The folding pivot pin 144 aids in securing the upper housing 102 to the lower housing 104. As will be described in further detail below, as the keyboard 100 transitions to the open configuration, the folding pivots 140, 142 pivot about the folding pivot pin 144. The upper and lower housing folding pivots 140, 142 are located near the sidewalls 122, 124 of the upper and lower housings 102, 104, respectively. More specifically, the folding pivots 140, 142 are located between 5-10 mm from their corresponding sidewalls 122, 124 to accommodate both the hinge assembly 126 and the stand mechanism 134. In the present disclosure, folding pivots 140, 142 and folding pivot pin 144 are provided near each sidewall 122, 124 of the keyboard 100, as shown in FIG. 1.

The upper and lower housings 102, 104 further define spine control plate recesses 146, 148, respectively, that are configured for receiving corresponding spine control plates 150 that protrude from the spine 106. More specifically, the upper housing 102 defines a plurality of spine control plate recesses 146 along the axis "L" that are substantially parallel to the upper housing sidewalls 122 and extend into the upper housing so as not to interfere with the upper housing keys 112. Similarly, the lower housing 104 also defines a plurality of spine control plate recesses 148 along the axis "L" that are substantially parallel to the lower housing sidewalls 124 and extend into the lower housing so as not to interfere with the lower housing keys 118. As seen in FIG. 1, the spine control plate recesses 146, 148 located closest to the sidewalls 122, 124 are aligned with each other. In contrast, the remaining, internal (i.e., located away from the sidewalls of the upper and lower housings 102, 104) spine control plate recesses 146, 148 are staggered relative to each other so as not to interfere with the staggered arrangement of the keys 112, 118. The spine control plates 150 are sized and shaped to fit within each of the corresponding recesses 146, 148, and are secured within the recesses by corresponding control pins (FIGS. 10-16), which will be described in further detail below.

In the present disclosure, the upper and lower housings 102, 104 each define four spine control plate recesses 146, 148; however it is appreciated that more or fewer spine control plate recesses (and accordingly spine control plates 150) may be suitable. Rather than providing a single hinge assembly that extends across the entire length of the horizontal axis "L" of the keyboard 100, the disclosed spine control plates and recesses provide a less bulky hinge assembly and a smooth transition of the keyboard between the open and closed configurations. The control plate recesses 146, 148 and the spine control plates 150 are substantially rectangular in shape; in other words, they have sharp corners. It is contemplated that this configuration ensures that the gap 132 defined between the upper and lower housings 102, 104 remains as small as possible.

Turning next to FIGS. 3-9, the stand mechanism 134 of the present keyboard 100 will be described in further detail. As mentioned briefly above, when the keyboard 100 transitions from the closed to the open configuration, the stand 136 moves from the first position (FIG. 2) to the second position (FIG. 1). In the first position, the stand 136 is stored in the upper housing stand recess 138 such that an outer face of the stand is substantially flush and parallel with the upper housing outer face 110. In the second position, the stand 136 defines an angle α (FIG. 9) with the upper housing outer face 110, which will be described in further detail below. To facilitate such movement between the first and second positions, the stand mechanism 134 further includes a drive bar 152 connected at a first end 154 thereof to the upper housing 102 and at a second end 156 thereof to the lower housing 104. The drive bar second end 156 can be secured to a leg that protrudes from the lower housing 104, as seen in FIG. 3, for example.

The drive bar 152 is slightly hooked or curved in shape so as not to interfere with the hinge assembly (described below with respect to FIGS. 10-16) during opening and closing of the keyboard 100. More specifically, the drive bar 152 extends into the spine 106 during movement of the stand 136, and is shaped to sweep around the hinge assembly 126 without interfering with the hinge assembly and without the need for cuts/indents in the inner faces 108, 114 of the upper and lower housings 102, 104, respectively. Furthermore, the drive bar 152 is shaped and configured such that during movement of the stand mechanism 134, internal components of the spine 106 are not visible. A push rod 158 is provided in the upper housing 102 and is connected at a first end 160 thereof to the stand 136 and at a second end 162 thereof to the drive bar first end 154 by a drive bar pin (not shown).

The upper housing 102 further defines a push rod slot 164 (FIGS. 5-9) that is configured for slidably receiving the push rod 158 and for enabling sliding movement of the push rod during transition of the stand 136 between the first and second positions. A bracing strut 166 is further provided and is connected at a first end 168 thereof to the upper housing 102 and at a second end 170 thereof to the stand 136. The bracing strut first end 168 is connected to the upper housing 102 by a bracing strut pivot pin 172 that enables rotation/pivoting of the bracing strut during opening and closing of the keyboard 100. The bracing strut 166 is shaped and sized to be received in a corresponding strut recess 174 defined in the upper housing 102 and configured for enabling smooth and controlled movement of the bracing strut during opening and closing of the keyboard 100, as described in more detail below.

During movement of the upper housing 102 relative to the lower housing 104, the stand 136 transitions from the first position to the second position. Specifically, as shown in FIG. 3, the stand 136 is in the first position and is stored within the upper housing stand recess 138. Turning to FIGS. 4-9, as the keyboard 100 is opened, the drive bar 152 drives the push rod 158 along the push rod slot 164, thereby pivoting the bracing strut 166 and moving the stand 136 from the first position to the second position. During this movement, the drive bar 152 drives the push rod 158 such that it slides within the push rod slot 164 in a direction substantially parallel to the upper housing sidewall 122 and towards the outer edge 128 of the upper housing 102. Such driving movement of the push rod 158 translates to the stand 136, which causes the bracing strut 166 to start rotating about the bracing strut pin 172 within the strut recess 174, thereby pushing the stand away from the upper housing until it reaches the second position. When the bracing strut 166 has reached the end of its rotational travel, the keyboard 100 is in the fully open position and the stand 136 is in the second position (FIG. 9), defining the angle α with the upper housing outer face 110.

Although other angles may be suitable, in the present disclosure, the angle α is between 20-25° and more specifically is approximately 22.5°. It is contemplated that such an angle α enables the stand 136 to contact a ground/desk surface such that the upper rows of keys 112 are supported when the keyboard 100 is in the open configuration, thereby preventing the keyboard from toppling or tipping during use. The length of the bracing strut 166 dictates the size of the angle α—in other words, increasing the length of the bracing strut would result in a larger angle α, whereas decreasing the length of the bracing strut would result in a smaller angle α. The bracing strut 166 also acts as a support when the stand 136 is in the second position to prevent the stand from collapsing back to the first position and to maintain the angle α defined between the stand and the upper housing outer face 110. As the bracing strut 166 is rotated beyond 90° when the stand 136 is in the second position, no latch, detent or other locking means is necessary to hold the stand in the second position.

As the stand mechanism 134 is deployed as described above, the hinge assembly 126 in the spine 106 simultaneously enables the keyboard 100 to transition from the closed to the open configuration, as will now be described with respect to FIGS. 10-17. The hinge assembly 126 includes an arc slot 176 defined in the spine plate 150 that is configured for driving rotation of the spine 106 during opening and closing of the keyboard 100. In the present disclosure, the arc slot 176 is arranged at a substantially 45° angle relative to a bottom edge 178 of the spine 106 (FIG. 10), although other orientations may be possible. It is contemplated that by arranging the arc slot 176 at the substantially 45° angle, the components of the hinge assembly 126 during opening and closing of the keyboard 100 will not interfere with the drive bar 152 and other components of the stand mechanism 134. It is also contemplated that by arranging the arc slot 176 at the substantially 45° angle, the spine 106 is thick/tall enough to include on-board power (not shown) for the keyboard 100. The arc slot 176 is configured for receiving a corresponding spine motion drive pin 180 that slides within the arc slot during opening and closing of the keyboard 100. More specifically, the upper housing 102 includes a spine motion drive bar 182, and the spine motion drive pin 180 protrudes from the bar and engages the arc slot 176.

The hinge assembly further includes a first symmetry control slot 184 in an upper portion of the spine plate 150 and a second symmetry control slot 186 in a lower portion of the spine plate. In the present disclosure, the first and second symmetry control slots 184, 186 are located on opposing sides of the spine plate 150. The upper housing 102 includes a first symmetry control pin 188 that is configured for engaging the first symmetry control slot 184 and for sliding within the control slot during opening and closing of the keyboard 100. Similarly, the lower housing 104 includes a second symmetry control pin 190 configured for engaging the second symmetry control slot 186 and for sliding within the control slot during opening and closing of the keyboard 100.

As the keyboard 100 is transitioned from the closed configuration (FIG. 10) to the open configuration (FIG. 16), the drive pin 180 moves within the arc slot 176, which drives the first and second symmetry control pins 188, 190 to move within their respective slots 184, 186, as seen in FIGS. 11-15. Once in the open configuration (FIG. 16), the drive pin bar 182 is received within a drive bar recess 192 (best seen in FIG. 14) defined in the lower housing spine plate recess 148, and the drive pin 180 is located near the bottom edge 178 of the spine 106 in the arc slot 176. During opening and closing of the keyboard 100, the hinge assembly 126 is hidden from view due to the arrangement of the spine control plates 150 in their respective spine control recesses 146, 148.

In the open configuration (FIGS. 1 and 16), the gap 132 defined between the upper and lower housings 102, 104, is minimized due to the construction of the hinge assembly 126 and the upper and lower housings. Specifically, the upper and lower housings 102, 104 each have a substantially rectangular shape with sharp corners that could interfere with the spine 106 during movement. However, due to the configuration of the arc slot 176 and first and second symmetry control slots 184, 186, the transition between the open and closed configurations is smooth and there is no contact or interference between the spine 106 and the upper and lower housings 102, 104. In addition, due to the staggered arrangement of the spine plates 150, the staggered vertical/columnar arrangement of the keys 112, 118 of the keyboard 100 is not disrupted. Furthermore, the configuration of the spine plates 150 and corresponding spine plate recesses 146, 148 along the horizontal axis "L" of the keyboard 100 allows for a substantially slimmer keyboard in comparison to conventional portable keyboards, which typically include mechanical elements only at the outer extremities of the keyboard, thereby requiring thicker keyboards to resist flexion and/or twisting during opening and closing of the keyboard.

Figure 9:
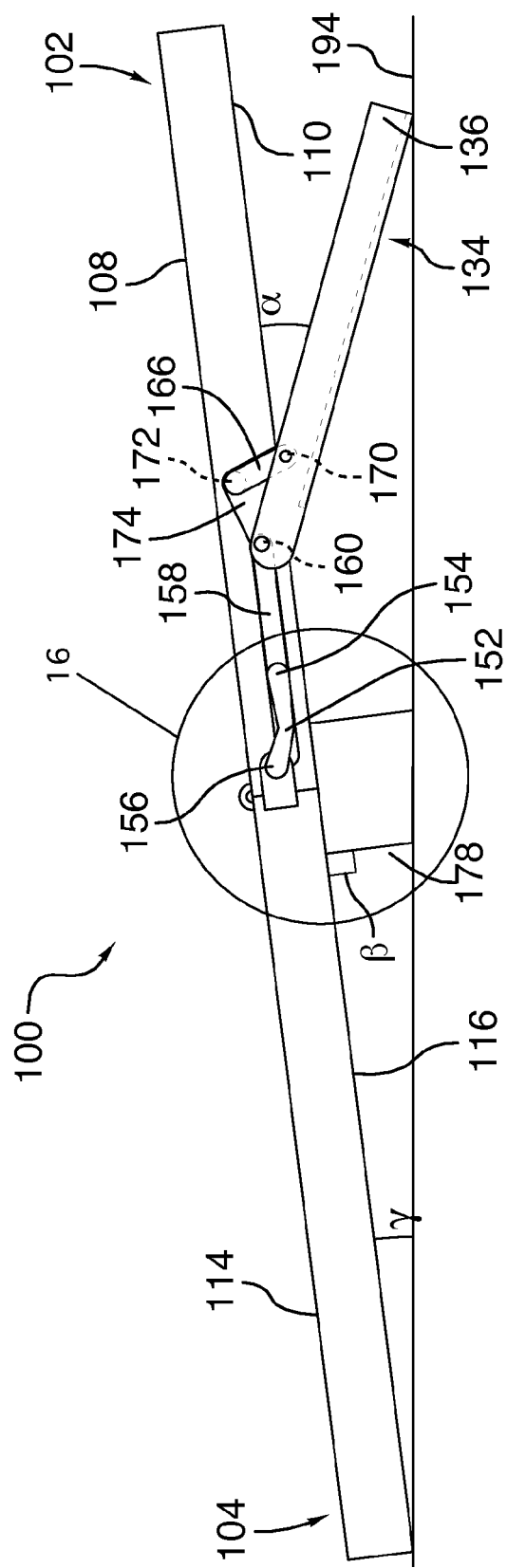
FIG. 9 is a side view of the stand mechanism of the foldable keyboard in the open configuration.

When the keyboard 100 is in the open configuration, the bottom edge 178 of the spine 106 defines an angle β with the outer face 116 of the lower housing 104. In addition, the outer face 116 of the lower housing 104 defines an angle γ with a surface 194 on which the keyboard 100 is resting (FIG. 9). In the present disclosure, the angle β can be approximately 90°. To provide an ergonomic typing surface, the angle γ can be between 5-20° and in the present disclosure is approximately 7.5°, similar to the angle defined by conventional desktop keyboards, for example.

The present foldable keyboard provides a slim and simple mechanism that folds along the horizontal axis of the keyboard, thereby allowing for an even split amongst the rows of keys and for a simple hinge assembly. This is in contrast to conventional foldable keyboards which typically fold along a vertical axis of the keyboard and require a more complicated hinge assembly due to the staggered nature of the keys. The present foldable keyboard provides a layout of keys that is similar to a full-sized staggered keyboard, and as a result the typical pitch and spacing between keys is not disrupted. During opening and closing of the keyboard, a stand is pushed out from the upper housing of the keyboard to support the opened keyboard at an angle relative to a flat or stable surface. The present foldable keyboard stand automatically unfolds or transitions during opening and closing of the keyboard. When the foldable keyboard is in the closed configuration, the keys are protected and in some instances can sink relative to their respective housings to prevent direct contact between the keys in the closed configuration.

While a particular embodiment of the present foldable keyboard has been described herein, it will be appreciated by those skilled in the art that changes and modifications may be made thereto without departing from the disclosure in its broadest aspects and as set forth below.

The invention claimed is:

1. A foldable keyboard comprising:
 an upper housing having a plurality of keys having a recess formed therein and having at least a first row of keys;
 a lower housing having a plurality of keys having at least a second row of keys;
 a spine member configured for pivotally connecting the upper and lower housings along a horizontal axis defined by the upper and lower housings;
 a hinge mechanism provided in the spine member and configured for enabling movement of the upper housing relative to the lower housing to move the keyboard between a closed configuration and an open configuration; and
 a stand mechanism that includes a stand pivotally connected to the upper housing and received within the recess in the upper housing when the keyboard is in the closed configuration, the stand configured to pivot relative to the upper housing from a first position to a second position as the keyboard moves from the closed configuration to the open configuration such that when the keyboard is in the open configuration the stand contacts a surface that supports the foldable keyboard beneath the first row of keys to thereby support the first row of keys, wherein the stand mechanism further includes:
 a drive bar connected at a first end to the upper housing and at a second end to the lower housing;
 a push rod connected at a first end to the stand and at a second end to the upper housing;
 a push rod slot defined in the upper housing and configured for slidably receiving the push rod; and
 a bracing strut connected at a first end to the upper housing and at a second end to the stand;
 wherein during movement of the upper housing relative to the lower housing, the drive bar drives the push rod along the push rod slot, thereby pivoting the bracing strut and moving the stand from the first position to the second position.

2. The foldable keyboard of claim 1 wherein in the closed configuration, a top surface of the spine is flush with an outer face of the upper housing.

3. The foldable keyboard of claim 1 wherein in the closed configuration, a bottom surface of the spine is flush with an outer face of the lower housing.

4. The foldable keyboard of claim 3 wherein in the open configuration, the bottom surface of the spine defines an angle with the outer face of the lower housing.

5. The foldable keyboard of claim 1 wherein the hinge mechanism includes:
 a slot defined in the spine;
 a pivot bar having a pivot pin at a first end thereof, the pivot pin configured for being received in the slot;
 an upper housing slot defined in the spine and configured for receiving a corresponding upper housing pin; and
 a lower housing slot defined in the spine and configured for receiving a corresponding lower housing pin.

6. The foldable keyboard of claim 5 wherein the pivot bar includes a second end that is attached to the upper housing, and wherein during movement of the upper housing relative to the lower housing, the pivot pin slides within the slot.

7. The foldable keyboard of claim 1 further including:
 at least one spine plate extending from the upper housing;
 at least one spine plate extending from the lower housing; and
 at least one spine plate recess defined in the spine;
 wherein each spine plate recess is configured for receiving a corresponding spine plate, the spine plate recess and corresponding spine plate being pivotally connected by a corresponding pin.

8. The foldable keyboard of claim 1 wherein the upper housing further defines a strut recess configured for receiving the bracing strut and allowing pivotable movement thereof during movement of the stand between the first and second positions.

9. The foldable keyboard of claim 1 wherein the stand mechanism further includes a leg having a first end connected to the lower housing and a second end connected to the second end of the drive bar.

10. The foldable keyboard of claim 1 wherein in the closed configuration, the keys on the lower housing are recessed relative to an inner face of the upper housing.

* * * * *